Sept. 27, 1927.
G. E. JONES, SR
1,643,460
WHEEL
Filed July 16, 1925
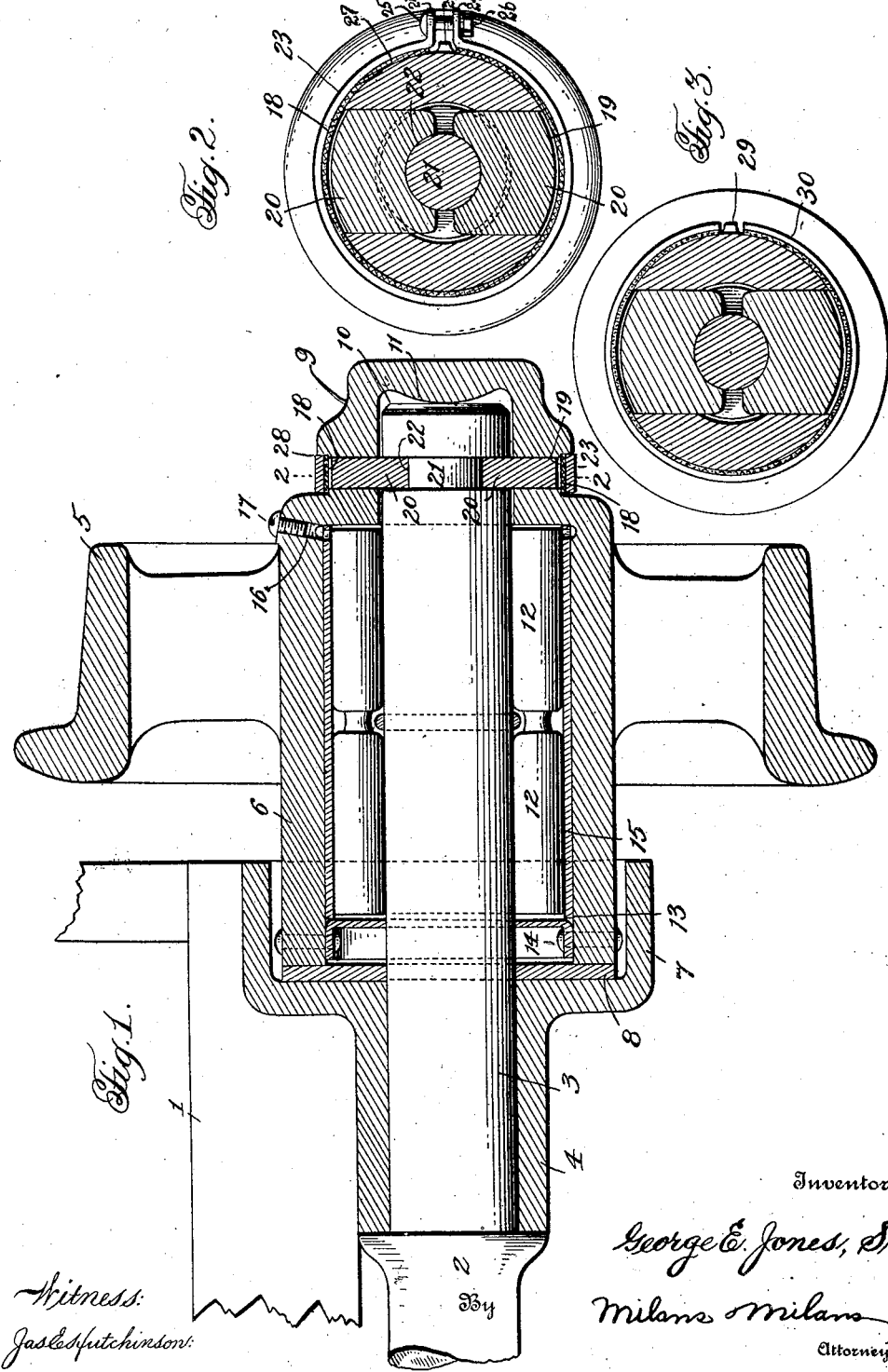

Patented Sept. 27, 1927.

1,643,460

UNITED STATES PATENT OFFICE.

GEORGE E. JONES, SR., OF KNOXVILLE, TENNESSEE.

WHEEL.

Application filed July 16, 1925. Serial No. 44,047.

My invention relates to new and useful improvements in wheels and more particularly to means for securing the wheel upon an axle, the principal object of the invention residing in the provision of novel means whereby the wheel is held upon the axle against longitudinal movement relative thereto but is allowed to freely rotate thereon.

Another object consists in providing keys adapted to be carried by the wheel and engageable in a recess formed in the axle, detachable means also being provided for retaining the keys normally in their locking position but allowing removal thereof when it is desired to remove the wheel from the axle.

Still another object resides in the provision of means whereby the key retaining means is held against rotation relative to the wheel thereby preventing accidental displacement of the keys.

With the above, and other objects in view, which will appear as the description proceeds my invention consists in the noval details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a longitudinal vertical section with parts shown in elevation.

Fig. 2 is a transverse vertical section on the line 2—2 of Fig. 1, the retaining band for the securing keys being shown in elevation; and Fig. 3 is a view similar to Fig. 2 showing a slightly modified form of retaining band.

While I have illustrated in the drawings, my invention as applied to a roller bearing wheel I wish it distinctly understood that the invention is equally as well adapted for use with a plain bearing wheel.

In the drawings 1 indicates the vehicle body, in the instances shown, a mine car body, 2 the axle secured thereto in the usual manner, 3 the axle spindle, 4 the axle housing, and 5 the wheel with the hub 6. The housing 4 has the enlarged end 7 into which the inner end of the hub 6 extends and bears against the thrust washer 8. The outer end of the hub 6 is formed with the reduced extenison 9 provided with the recess 10 which receives the outer end of the axle spindle 3, the outer end of the spindle bearing against the convex projection 11 as more particularly illustrated in Fig. 1 of the drawings, this convex projection 11 taking the inward thrust of the wheel. In the drawings I have illustrated the roller bearings 12 as being provided interiorly of the hub but as previously stated I do not wish to be limited to the use of my invention in connection with a roller bearing wheel. In the instance shown the plate 13 is secured adjacent the inner end of the hub by means of the rivets 14 and forms a closure for the inner end of the hub for retaining the roller bearings 12 therein. A sleeve 15 is shown mounted in the hub and at 16 I have illustrated an oil opening normally closed by the screw plug 17.

Formed in the reduced extension 9 of the hub are the slots 18 and 19 into which are adapted to be received the keys 20 the inner ends of the keys being engageable in a groove 21 formed in the axle spindle 3 and the inner ends of the keys being recessed as shown at 22 to conform to the curvature of the reduced portion of the spindle formed by the groove 21. When the keys are in position in the hub and engaged in the spindle groove it will be seen that longitudinal movement of the wheel relative to the axle spindle or axle is prevented.

The keys are held within the hub by means of the retaining band 23 which overlies the slots 18 and 19, the retaining band shown in Fig. 2 having the right angle extensions 24 through which a bolt 25 or other similar fastening passes and is secured in position by means of the nut 26. A felt or rubber packing 27 is interposed between the retaining band 23 and the surface of the hub to prevent leakage of grease. Preferably the outer surfaces of the hub will be recessed or grooved as shown at 28 to receive the retaining band. For preventing rotation of the retaining band upon the hub a lug 29 is formed on the hub and is adapted to be received between the ends of the retaining band as is more clearly illustrated in Fig. 2 of the drawings.

In Fig. 3 I have illustrated a slightly modified form of retaining band, in this figure the retaining band shown at 30 being of a spring construction with the projection 29 received between the ends thereof. It will be noted that this spring band shown in Fig. 3 does not have the projections through which a bolt extends and is merely held in position by the spring action. In all other respects the construction illustrated in Fig. 3 is the same as that illustrated in Fig. 2.

From the above detail description it will be seen that I have provided novel means for securing a wheel upon an axle spindle the keys 20 being normally carried by the hub, with their ends received in the groove 21 of the spindle and held in position by the retaining band. The retaining band is held against rotation upon the hub by means of the projection 29 which enters the space between the free ends thereof. When it is desired to remove the wheels the keys may be released from the spindle by removing the retaining band and allowing the keys to drop from the hub.

Having fully described my invention what I claim as new and desire to secure by Letters Patent is:

1. The combination with an axle having a recess therein, of a wheel adapted to be rotatably received upon the axle and having a recess in the hub thereof, a key received in the recess of the hub and engageable in the recess of the axle for preventing longitudinal movement of the wheel relative to the axle, a band encircling the hub over the recess therein for retaining the key in the recess, and means carried by the hub and engageable with the band for preventing rotation of the band relative to the hub.

2. The combination with an axle having a recess therein, of a wheel adapted to be rotatably received upon the axle and having a recess in the hub thereof, a key received in the recess of the hub and engageable in the recess of the axle for preventing longitudinal movement of the wheel relative to the axle, a band encircling the hub over the recess therein for retaining the key in the recess, and a projection formed on the hub and engageable with the band for preventing rotation of the band relative to the hub.

3. The combination with an axle having a recess therein, of a wheel adapted to be rotatably received upon the axle and having a recess in the hub thereof, a key received in the recess of the hub and engageable in the recess of the axle for preventing longitudinal movement of the wheel relative to the axle, a split band encircling the hub over the recess therein for retaining the key in the recess, and a projection formed on the hub and extending between the ends of the split band for preventing rotation of the band relative to the hub.

4. The combination with an axle having a recess therein, of a wheel adapted to be rotatably received upon the axle and having a recess in the hub thereof, a key received in the recess of the hub and engageable in the recess of the axle for preventing longitudinal movement of the wheel relative to the axle, a band encircling the hub over the recess therein for retaining the key in the recess, and means for adjusting the band so as to tightly engage the hub.

In testimony whereof I hereunto affix my signature.

GEORGE E. JONES, Sr.